United States Patent
Wang et al.

(10) Patent No.: US 9,086,287 B2
(45) Date of Patent: Jul. 21, 2015

(54) METHOD AND APPARATUS FOR PROVIDING VEHICLE NAVIGATION INFORMATION WITHIN AN ELEVATED ROAD AREA

(71) Applicant: Bosch Automotive Products (Suzhou) Co. Ltd., Suzhou, Jiangsu (CN)

(72) Inventors: Jian Wang, Jiangsu (CN); Jian An, Jiangsu (CN)

(73) Assignee: Bosch Automotive Products (Suzhou) Co. Ltd., Suzhou (CN)

( * ) Notice: Subject to any disclaimer, the term of this patent is extended or adjusted under 35 U.S.C. 154(b) by 0 days.

(21) Appl. No.: 14/472,747

(22) Filed: Aug. 29, 2014

(65) Prior Publication Data

US 2015/0066351 A1 Mar. 5, 2015

(30) Foreign Application Priority Data

Aug. 30, 2013 (CN) .......................... 2013 1 0388741

(51) Int. Cl.
| | |
|---|---|
| G01C 21/00 | (2006.01) |
| G01C 21/20 | (2006.01) |
| G01C 21/30 | (2006.01) |

(52) U.S. Cl.
CPC ................ *G01C 21/20* (2013.01); *G01C 21/30* (2013.01)

(58) Field of Classification Search
USPC .......................... 701/400, 408, 409, 412, 413
See application file for complete search history.

(56) References Cited

U.S. PATENT DOCUMENTS

| | | | |
|---|---|---|---|
| 2013/0286205 A1* | 10/2013 | Okada et al. .................. 348/148 |
| 2014/0002658 A1* | 1/2014 | Kim et al. ..................... 348/148 |
| 2014/0184800 A1* | 7/2014 | Hirai et al. .................... 348/148 |

* cited by examiner

*Primary Examiner* — Kim T Nguyen
(74) *Attorney, Agent, or Firm* — Michael Best & Friedrich LLP

(57) ABSTRACT

A method for providing vehicle navigation information within an elevated road area comprising the steps of: extracting at least one specific object from each of a plurality of images in an advancing direction of a vehicle while the vehicle is approaching to one ramp of the elevated road area, the plurality of images being obtained over time; determining a driving direction of the vehicle on the ramp in accordance with time characteristic of the specific object; and generating the vehicle navigation information from the driving direction and rendering the generated vehicle navigation information.

10 Claims, 4 Drawing Sheets

METHOD AND APPARATUS FOR PROVIDING VEHICLE NAVIGATION INFORMATION WITHIN AN ELEVATED ROAD AREA

BACKGROUND OF THE INVENTION

The present invention relates to the vehicle navigation technology, in particular, to a method for providing vehicle navigation information within an elevated road area and an apparatus for vehicle navigation capable of implementing the method.

Currently, the industry is paying more attention to an Intelligent Transportation System (ITS). As an important part of the ITS system, the vehicle navigation technology provides navigation information such as location, velocity, direction and geography on an electronic map in real time, so as to guide a driver to his destination more quickly and safely.

A typical vehicle navigation system comprises a navigation host and a display. An antenna built in the system receives wireless positioning signal transmitted from one ore more satellites orbiting around the earth, on the basis of which the vehicle location can be measured. The navigation host matches the location derived from the positioning signal with electronic map data to determine accurate position of a vehicle on the electronic map. On this basis, a variety of location-based services, such as driving navigation, route recommendation and information inquiry, are provided.

An elevated road is a bridge, road, railway or similar structure that is above the ground. It can divert traffic and improve transportation efficiency. Usually, the elevated road is built above a ground level road. This, however, brings about an issue on vehicle locating. In particular, because it is difficult to determine height variation of an object from satellite positioning signal, the satellite signal-based positioning method cannot differentiate between driving on an elevated road and driving on the ground level road thereunder. As a result, the accuracy of the navigation information is affected.

In view of the above, a method that can differentiate between these driving states is desirable.

SUMMARY OF THE INVENTION

An object of the present invention is to provide a method for accurately and reliably providing vehicle navigation information within an elevated road area.

A method for providing vehicle navigation information within an elevated road area according to one embodiment of the present invention comprising the steps of:

extracting at least one specific object from each of a plurality of images while the vehicle is approaching to one ramp of the elevated road area, the plurality of images being obtained over time;

determining a driving direction of the vehicle on the ramp in accordance with time characteristic of the specific object; and generating the vehicle navigation information from the driving direction and rendering the generated vehicle navigation information.

In the above embodiment, the travel path can be accurately predicated based on the driving state of a vehicle within the ramp, facilitating the generation of the vehicle navigation information in real time.

Preferably, in the above method, it determines whether the vehicle is approaching to one ramp of the elevated road area based on a distance between the vehicle and the ramp which is obtained by an apparatus for vehicle navigating.

Preferably, in the above method, the plurality of images are obtained at a time interval which depends on the length of the ramp.

Preferably, in the above method, the specific object is sky and elevated road, and further comprising the following steps between the step of extracting the specific object and the step of determining the driving direction:

determining whether a location of the extracted specific object matches a predetermined rule on a spatial relationship;

if matching, the extracted specific object is taken as one available for determining the driving direction, otherwise, it determines the plurality of images are obtained improperly.

Preferably, in the above method, the step of determining the driving direction comprising the following steps:

for each of the plurality of images, calculating a ratio of the area occupied by the sky to the total area and a ratio of the area occupied the elevated road to the total area;

determining whether the vehicle advances toward or leaves from the elevated road along the ramp based on the change of the ratios with time.

Because the change of the specific object is represented with the ratio of two areas, it significantly enhances reliability and accuracy when determining the driving direction.

Preferably, in the above method, the specific object is a lane, the step of determining the driving direction comprising the following steps:

determining how the location of the lane changes with time from the plurality of images;

determining whether the vehicle advances toward or leaves from the elevated road along the ramp based on the change of the location and data on the lane from the apparatus for vehicle navigating.

A further object of the present invention is to provide an apparatus for vehicle navigating, which can accurately and reliably provide vehicle navigation information within an elevated road area.

An apparatus for vehicle navigating according to one embodiment of the present invention comprises:

a receiving unit, configured to receive positioning signal from a satellite;

a display; and a processing unit coupled to the receiving unit and the display and configured to process the positioning signal and control the display to render navigation information thereon, further comprising an image unit coupled to the processing unit, comprising:

a device for acquiring a plurality of images, the plurality of images being obtained over time;

a device for extracting at least one specific object from each of the plurality of images and determining a driving direction of the vehicle on the ramp in accordance with time characteristic of the specific object, the processing unit further configured to:

initiate the acquiring operation and the extracting operation while judging based on the positioning signal that the vehicle is approaching to one ramp of an elevated road area; and generate the navigation information based on the driving direction and the positioning signal.

Preferably, in the above apparatus for vehicle navigating, the processing unit is further configured to control the device for acquiring the plurality of images to initiate the acquiring operation when it judges that the vehicle is approaching to one ramp of the elevated road area based on the positioning signal. Because the acquiring operation is triggered only when the vehicle is approaching to the ramp, it reduces the power consumption.

BRIEF DESCRIPTION OF THE DRAWINGS

The above and/or other aspects and advantages of the invention will become more clear and more easily understood from the following description of many aspects with reference to the accompanying drawings, in which identical or similar elements are denoted by identical reference signs, the accompanying drawings comprising.

Figure 1:
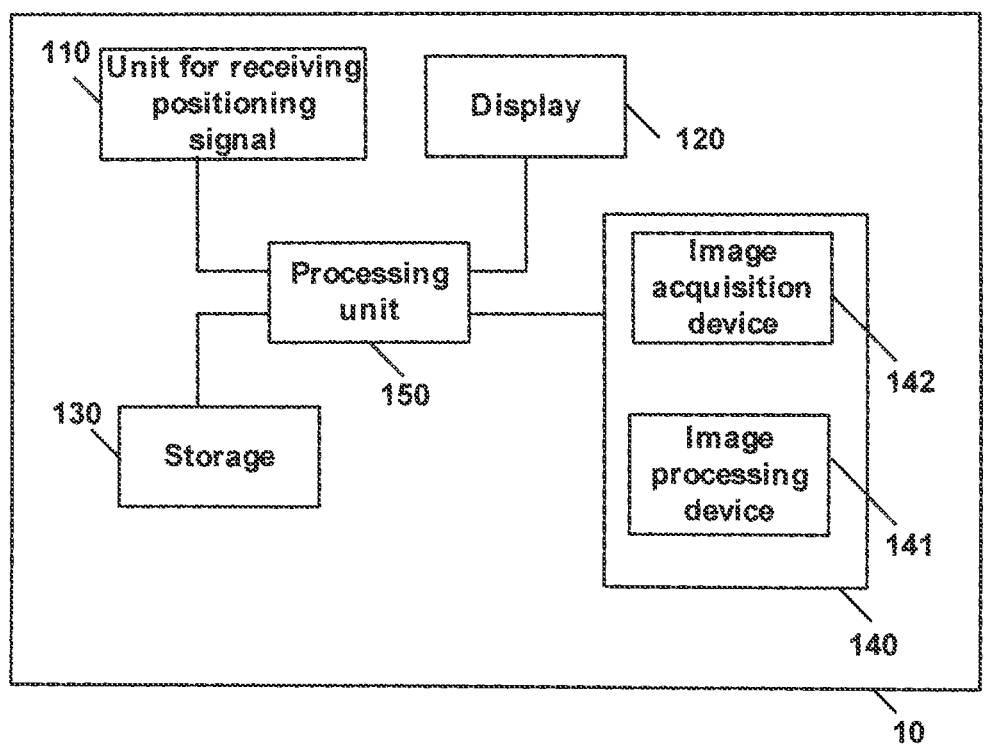
FIG. 1 is a block view showing the structure of an apparatus for vehicle navigating according to one embodiment of the present invention.

LIST OF REFERENCE SIGNS 10 an apparatus for vehicle navigating
110 unit for receiving positioning signal
120 display
130 storage
140 image unit
141 image acquisition device
142 image processing device
150 processing unit

DETAILED DESCRIPTION

The invention will be described more fully hereinafter with reference to the accompanying drawings which illustrate exemplary embodiments of the invention.

In the following description, the term "elevated road area" refers to the surface of the earth occupied by an elevated road and the space above and associated with the elevated road. In other words, in the case where an elevated road is built over a ground level road, the latter is also considered as part of an elevated road area. Therefore, regarding the expression such as "providing vehicle navigation information within an elevated road area", the information shall not only indicate the driving state of a vehicle on the elevated road, but also the driving state on the ground level road thereunder. As indicated above, the prior art satellite signal-based positioning method cannot differentiate between driving on an elevated road and driving on the ground level road thereunder, resulting in inaccurate navigation information. According to one or more embodiments of the present invention, it can well differentiate between these two driving states based on the driving direction while a vehicle is moving on a ramp, and thus can provide accurate navigation information.

FIG. 1 is a block view showing the structure of a vehicle navigation device according to one embodiment of the present invention;

As shown in FIG. 1, an apparatus for vehicle navigating 10 comprises a unit for receiving positioning signal 110, a display 120, storage 130, an image unit 140 and a processing unit 150 coupled to the aforementioned components.

In the present embodiment, the unit for receiving positioning signal 110 receives satellite positioning signal from satellite positioning systems such as the Beidou Navigation Satellite System (BDS), the Global Positioning System (GPS), the Galileo Satellite Navigation System and Global Navigation Satellite System (GLONASS). Navigation data are stored in the storage 130 and the processing unit 150 can invoke them from the storage 130. Then, the processing unit 150 determines the current location of a vehicle based on the received satellite positioning signal and by combining the navigation data stored in the storage 130, generates navigation information, which is rendered on the display 120.

Besides the navigation data, the storage 130 further stores controlling program(s) and other data for navigation functionality and for determining the driving state of the vehicle within an elevated road area.

Referring to FIG. 1, the image unit 140 comprises an image acquisition device 141 and an image processing device 142.

In the present embodiment, the image acquisition device 141 acquires a plurality of images along one advancing direction of the vehicle. It should be noted that the term "advancing direction" refers to not only one coinciding with the driving direction of the vehicle, but also one opposite to the driving direction. As can seen from the following description, the driving state of the vehicle on a ramp can be determined by the images acquired along either the direction coinciding with the driving direction or the direction opposite to the driving direction. In the present embodiment, the image acquisition device 141 comprises a camera for acquiring the images along the driving or forwarding direction. Alternatively, the image acquisition device 141 comprises a camera for acquiring the images along direction opposite to the forwarding direction, or comprises two cameras for acquiring the images along two directions.

In the present embodiment, preferably, the image acquisition device 141 operates under a triggering mode. In particular, when the processing unit 150 judges that the vehicle and a ramp in front of it are at a predetermined distance (e.g., 10 meters) based on the satellite positioning signal and the navigation data, it instructs the image acquisition device 141 in the image unit 140 to initiate an image acquiring operation. Preferably, the images are taken at a uniform time interval, which depends on the length of the ramp, e.g., proportional to the length. Alternatively, the image acquisition device 141 operates under a continuous mode.

The image processing device 142 is coupled to the image acquisition device 141. When the processing unit 150 judges that the vehicle and a ramp in front of it are at a predetermined distance (e.g., 10 meters) based on the satellite positioning signal and the navigation data, it instructs the image processing device 142 in the image unit 140 to perform a series of steps as described below, including the extraction of one or more specific objects and the determination of the driving state of the vehicle based on the change on the characteristics for the specific objects with time. Preferably, prior to extracting the specific objects, the image processing device 142 performs a pre-processing on the images to improve accuracy. The processing device 142 then sends the driving state as determined to the processing unit 150, which generates navigation information based thereon.

The term "driving state" includes but is not limited to a driving direction in which a vehicle takes on a ramp. In other words, the driving direction may be one along which the vehicle is advancing toward an elevated road, or one along which the vehicle is leaving from the elevated road.

The term "specific object" refers to anything having one or more characteristics changing with time while a vehicle is moving in a ramp. It includes but is not limited to the sky, an elevated road and a lane. For the sky or the elevated road, when the vehicle on the ramp is advancing toward the elevated road, the areas occupied by the sky and the elevated road in images taken along the driving direction will increase and decrease with time, respectively, and thus it can determine the vehicle is advancing toward the elevated road. On the other hand, when the vehicle on the ramp is leaving from the elevated road, the areas occupied by the sky and the elevated road in images taken along the driving direction will decrease and increase with time, respectively, and thus it can determine the vehicle is leaving from the elevated road. Preferably, in order to enhance stability and accuracy, a combination of several specific objects is utilized in the determination. For example, the driving direction can be determined by a ratio of the area occupied by the sky to the total area and a ratio of the area occupied by the elevated road to the total area, which change with time when the vehicle is moving on the ramp. In another example where the lane is taken as the specific object, when the vehicle on the ramp is advancing toward or leaving from the elevated road, the lane occupied by the vehicle will vary with time, and thus it can determine whether the vehicle is advancing toward or leaving from the elevated road based on the location change of the lane in images taken along the driving direction or the opposite direction. The lane data, e.g., indicating which lane is accessible to the ramp, may be included in some electronic maps. Therefore, the accuracy is further improved if the lane data are considered in the determination.

Figure 2:
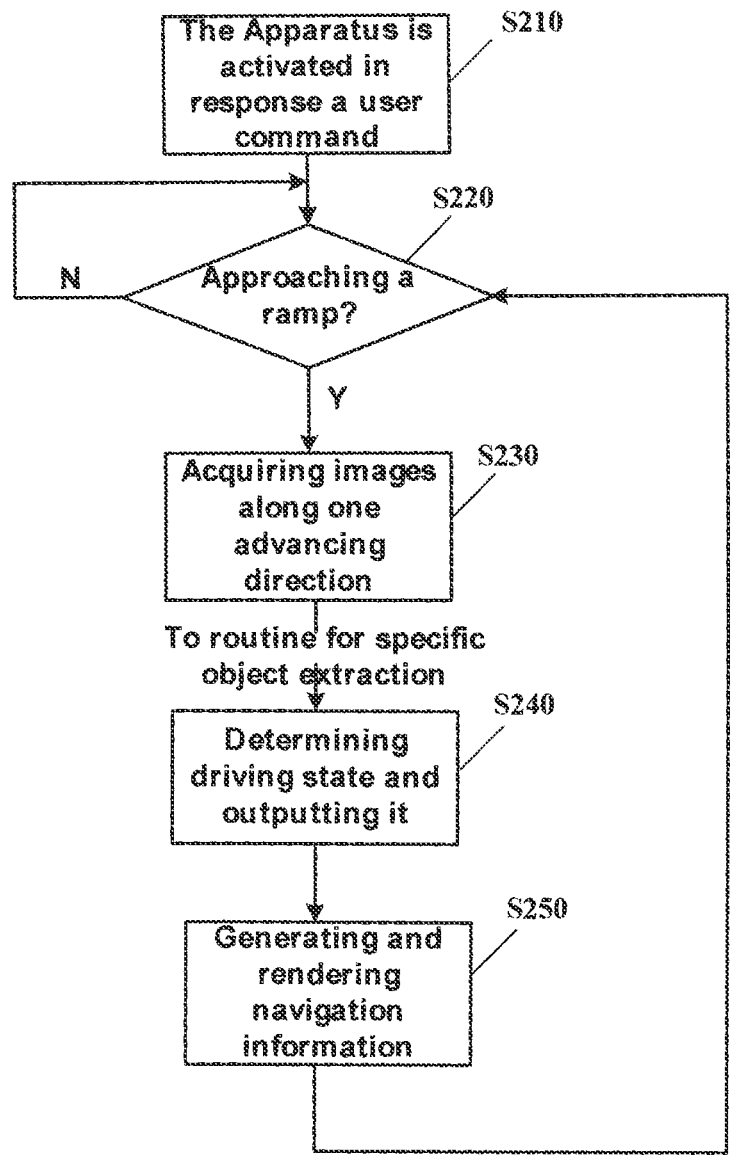
FIG. 2 is an overall flowchart of a method for providing vehicle navigation information within an elevated road area according to an embodiment of the invention.

FIG. 2 is an overall flowchart of a method for providing vehicle navigation information within an elevated road area according to an embodiment of the invention. For illustrative purpose, it assumes herein that the method according to the embodiment is implemented by means of the apparatus for vehicle navigating as shown in FIG. 1. However, it shall be noted that the principle of the invention is not limited to any apparatus having a specific structure.

As shown in FIG. 2, at step S210, the apparatus for vehicle navigating 10 is activated in response to a user command.

Afterwards, step S220 is carried out, where the processing unit 150 of the apparatus for vehicle navigating 10 determines the current location of the vehicle based on the satellite positioning signal received from the unit for receiving positioning signal 110, and further determines whether the vehicle is approaching a ramp based on the current location along with navigation data, e.g., by judging whether the vehicle and the ramp is at a predetermined distance. If the processing unit 150 determines that the vehicle is approaching the ramp, the method proceeds to step S230; otherwise, it continues to carry out step S220.

At step S230, the processing unit 150 instructs the image acquisition device 141 in the image unit 140 to begin to acquire a plurality of images along one advancing direction of the vehicle. As indicated above, the images along the advancing direction refers to those taken along either the direction coinciding with the driving direction or the direction opposite to the driving direction. In the present embodiment, it assumes that the image acquisition device 141 comprises a camera disposed on the front part of the vehicle to acquire the images along the driving direction. Preferably, the image acquisition device 141 acquires the images along the driving direction at a uniform time interval.

It should be noted that step S230 is unnecessary if the image acquisition device 141 operates under a continuous mode.

After step S230, the method as shown in FIG. 2 proceeds to a routine for specific object extraction, where one or more specific objects are extracted from each of the images for determining the driving state of the vehicle.

After the completion of the routine for specific object extraction, it proceeds to step S240, where the image processing device 142 determines the driving state of the vehicle on the ramp based on the change on the characteristics for the specific objects with time and outputs the driving state as determined to the processing unit 150. The determination for the driving state has been described as above and is also applicable herein. Thus the relevant description is omitted.

Then, it proceeds to step S250, where the processing unit 150 generates navigation information based on the driving state output from the image process device 142, and renders the navigation information on the display 120. After the completion of step S250, the method as shown in FIG. 2 return step S220.

Figure 3:
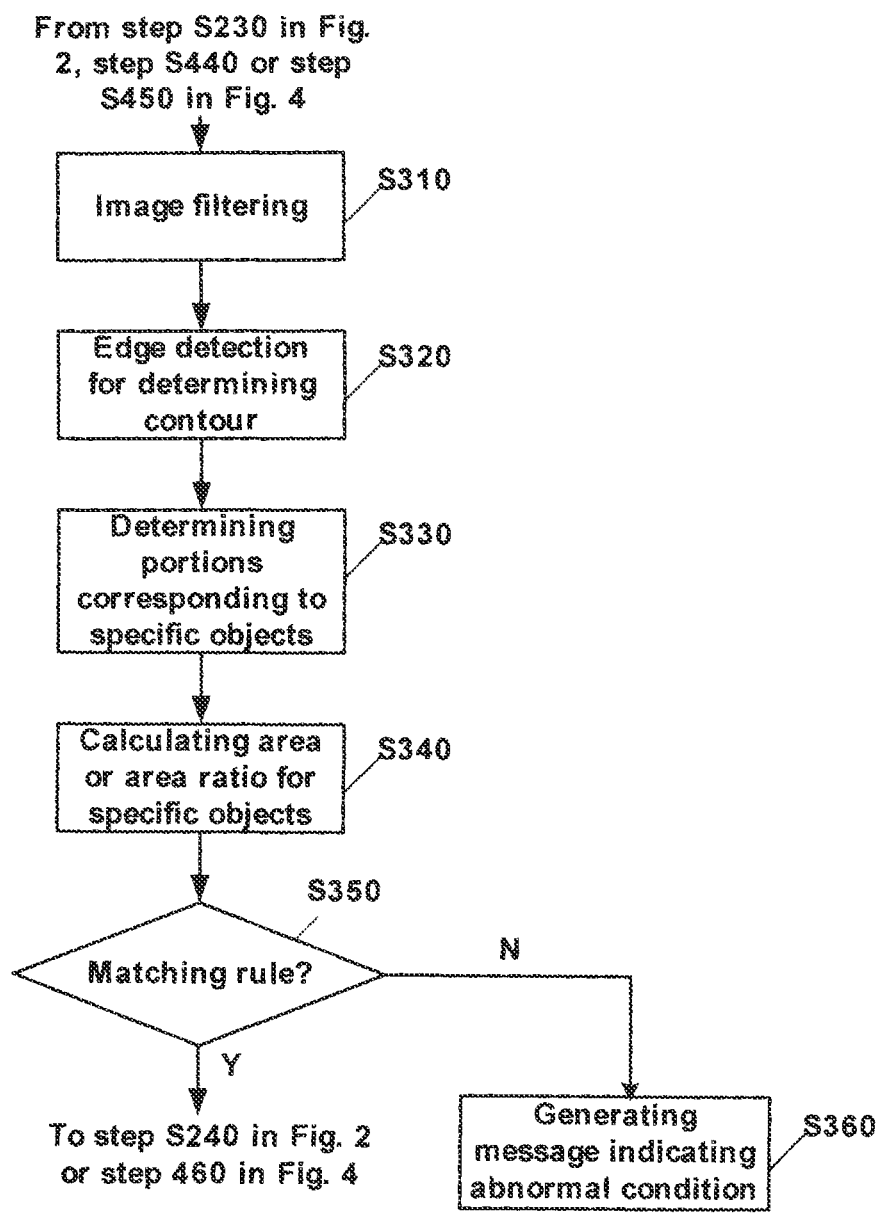
FIG. 3 is a flowchart showing a routine for specific object extraction used in the method as shown in FIG. 2.

FIG. 3 is a flowchart showing a routine for specific object extraction used in the method as shown in FIG. 2.

As shown in FIG. 3, at step S310, the image processing device 142 performs an filtering operation on each of the plurality of images obtained at step S230 in order to suppress noise in the images while retaining the details in the images as much as possible.

Afterwards, at step S320, the image processing device 142 performs an edge-detection operation on the each of the plurality images to obtain the contour of a plurality of portions in each of the images.

Then, step S330 is carried out at the image processing device 142 to determine the portions corresponding to one or more specific objects in each of the images. Following step S330, step 340 is carried out at the image processing device 142, which separates the portions corresponding to the specific objects from other portions based on the contour obtained at step S320, and calculates the area occupied by the specific objects in each of the images. As indicated above, in the case where a plurality of specific objects are under consideration, the image processing device 142 may calculate an area ratio for each of the specific objects.

Then, at step S350, the image processing unit 142 perform a topological relationship analysis for each of the images to judge whether the location of the specific object(s) matches a predetermined rule on spatial relationship. If matching the rule, the routine proceeds to step S240 as shown in FIG. 2; otherwise, it proceeds to step S360. For example, in an image taken properly, the sky shall be always at the top of the image. Therefore, in the topological relationship analysis, if it finds that the sky is not at the top, the image processing unit will make an judgment that the location does not match the predetermined rule on spatial relationship.

At step S360, the image processing unit 142 generates a message indicating the image acquisition or processing is abnormal and transmits it to the processing unit 150.

Figure 4:
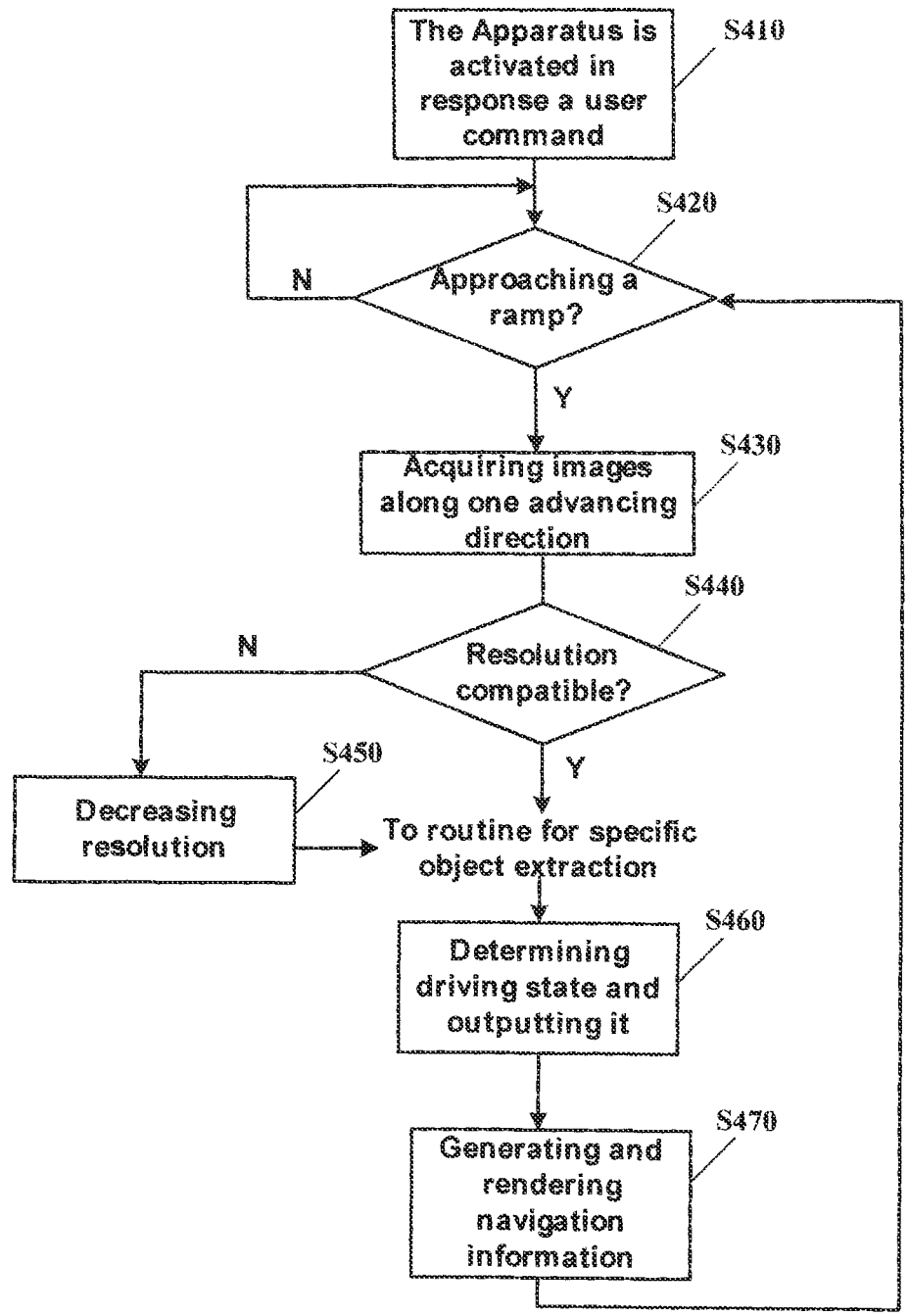
FIG. 4 is an overall flowchart of a method for providing vehicle navigation information within an elevated road area according to another embodiment of the invention.

FIG. 4 is an overall flowchart of a method for providing vehicle navigation information within an elevated road area according to another embodiment of the invention. As compared with the embodiment as shown in FIG. 2, the difference lies in the inclusion of a step for image pre-processing between the step of acquiring the images and the routine for specific object extraction.

Referring to FIG. 4, at step S410, the apparatus for vehicle navigating 10 is activated in response to a user command. Then, at step S420, the processing unit 150 of the apparatus for vehicle navigating 10 determines whether the vehicle is approaching a ramp based on the satellite positioning signal along with navigation data. If the processing unit 150 determines that the vehicle is approaching the ramp, the method proceeds to step S430; otherwise, it continues to carry out step S420.

At step S430, the processing unit 150 instructs the image acquisition device 141 in the image unit 140 to begin to acquire a plurality of images along one advancing direction of the vehicle.

After the completion of step S430 for acquiring the plurality of images by the image acquisition device 141, the image processing device 142 makes a judgment whether the resolution of the obtained images is compatible with the image processing algorithm utilized in the routine for specific object extraction. If compatible, the method proceeds to the routine as shown in FIG. 3; otherwise, it proceeds to step S450, where the resolution is decreased and then proceeds to the routine to extract the specific objects from the images with the decreased resolution.

After the completion of the routine for specific object extraction as shown in FIG. 3, it proceeds to step S460, where the image processing device 142 determines the driving state of the vehicle on the ramp based on the change on the characteristics for the specific objects with time and outputs the driving state as determined to the processing unit 150.

Then, it proceeds to step S470, where the processing unit 150 generates navigation information based on the driving state output from the image process device 142, and renders the navigation information on the display 120. After the completion of step S470, the method as shown in FIG. 4 return step S420.

The embodiments of the invention will be described in detail with reference to the accompanying drawings. While some aspects of the invention have been illustrated and discussed, it will be appreciated by those skilled in the art that these aspects can be modified without departing from the principle and spirit of the invention. Therefore, the scope of the invention will be defined by the appended claims and equivalents thereof.

What is claimed is:

1. A method for providing vehicle navigation information within an elevated road area, comprising the steps of:
    extracting at least one specific object from each of a plurality of images in an advancing direction of a vehicle while the vehicle is approaching one ramp of the elevated road area, the plurality of images being obtained over time;
    determining a driving direction of the vehicle on the ramp in accordance with a time characteristic of the specific object; and
    generating, with a processing unit, the vehicle navigation information from the driving direction and rendering the generated vehicle navigation information.

2. The method according to claim 1, further comprising determining whether the vehicle is approaching the one ramp of the elevated road area based on a distance between the vehicle and the ramp which is obtained by an apparatus for vehicle navigating.

3. The method according to claim 1, wherein the plurality of images are obtained at a time interval which depends on a length of the ramp.

4. The method according to claim 1, wherein the specific object is sky and elevated road, and further comprising the following steps between the step of extracting the specific object and the step of determining the driving direction:
    determining whether a location of the extracted specific object matches a predetermined rule on a spatial relationship; and
    if matching, the extracted specific object is taken as one available for determining the driving direction, otherwise, determining the plurality of images are obtained improperly.

5. The method according to claim 1, wherein the step of determining the driving direction comprising the following steps:
    for each of the plurality of images, calculating a ratio of an area occupied by the sky to a total area and a ratio of an area occupied by the elevated road to the total area;
    determining whether the vehicle advances toward or leaves from the elevated road along the ramp based on a change of the ratios with time.

6. The method according to claim 1, wherein the specific object is a lane, the step of determining the driving direction comprising the following steps:
    determining how a location of the lane changes with time from the plurality of images;
    determining whether the vehicle advances toward or leaves from the elevated road along the ramp based on the change of the location and data on the lane from the apparatus for vehicle navigating.

7. An apparatus for vehicle navigating, comprising:
    a receiving unit, configured to receive a positioning signal from a satellite;
    a display; and
    a processing unit coupled to the receiving unit and the display and configured to process the positioning signal and control the display to render navigation information thereon,
    further comprising an image unit coupled to the processing unit, the image unit comprising:
        a device for acquiring a plurality of images in an advancing direction of a vehicle, the plurality of images being obtained over time; and
        a device for extracting at least one specific object from each of the plurality of images and determining a driving direction of the vehicle on a ramp in accordance with a time characteristic of the specific object,
    the processing unit further configured to:
        initiate the acquiring operation and the extracting operation while judging based on the positioning signal that the vehicle is approaching one ramp of an elevated road area; and
        generate the navigation information based on the driving direction and the positioning signal.

8. The apparatus for vehicle navigating according to claim 7, wherein the processing unit is further configured to control the device for acquiring the plurality of images to initiate the acquiring operation when it judges that the vehicle is approaching the one ramp of the elevated road area based on the positioning signal.

9. The apparatus for vehicle navigating according to claim 7, wherein the step of determining the driving direction comprising the following steps:
    for each of the plurality of images, calculating a ratio of an area occupied by the sky to a total area and a ratio of an area occupied by the elevated road to the total area; and
    determining whether the vehicle advances toward or leaves from the elevated road along the ramp based on a change of the ratios with time.

10. The apparatus for vehicle navigating according to claim 7, wherein the specific object is a lane, the step of determining the driving direction comprising the following steps:
    determining how a location of the lane changes with time from the plurality of images; and
    determining whether the vehicle advances toward or leaves from the elevated road along the ramp based on a change of the location and data on the lane from the apparatus for vehicle navigating.

* * * * *